C. H. VEEDER.
TACHOMETER.
APPLICATION FILED MAR. 24, 1911.
1,016,906.
Patented Feb. 6, 1912.
4 SHEETS—SHEET 3.
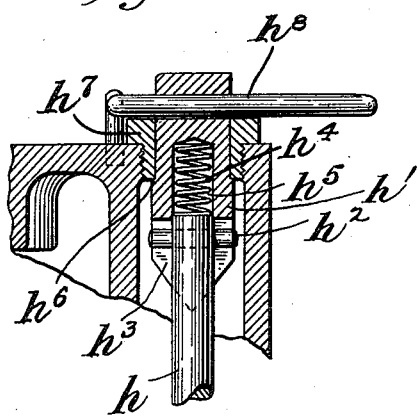
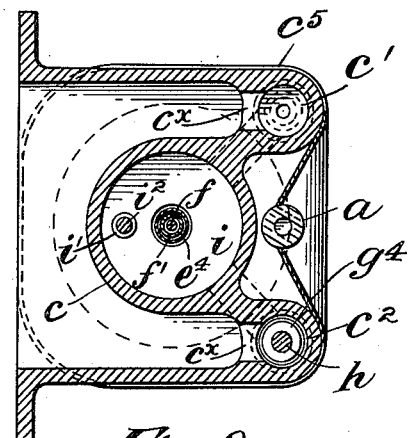
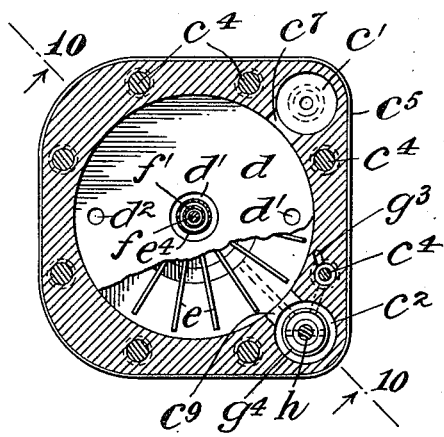
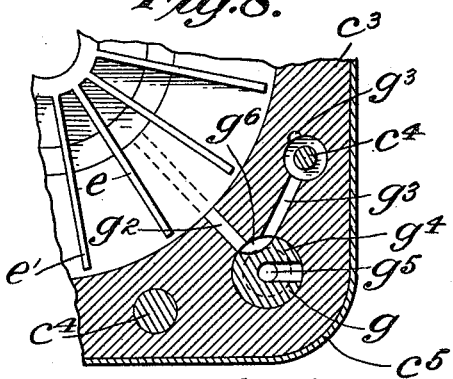
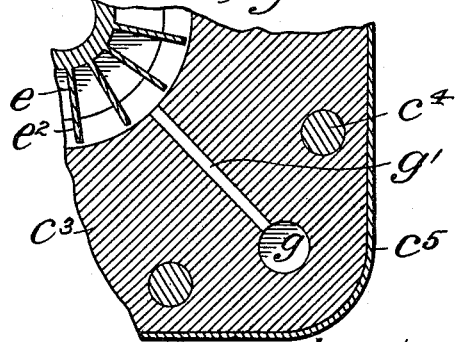
Attest:
Inventor:
by Curtis Hussey Veeder
Redding, Greeley & Austin
Attys.

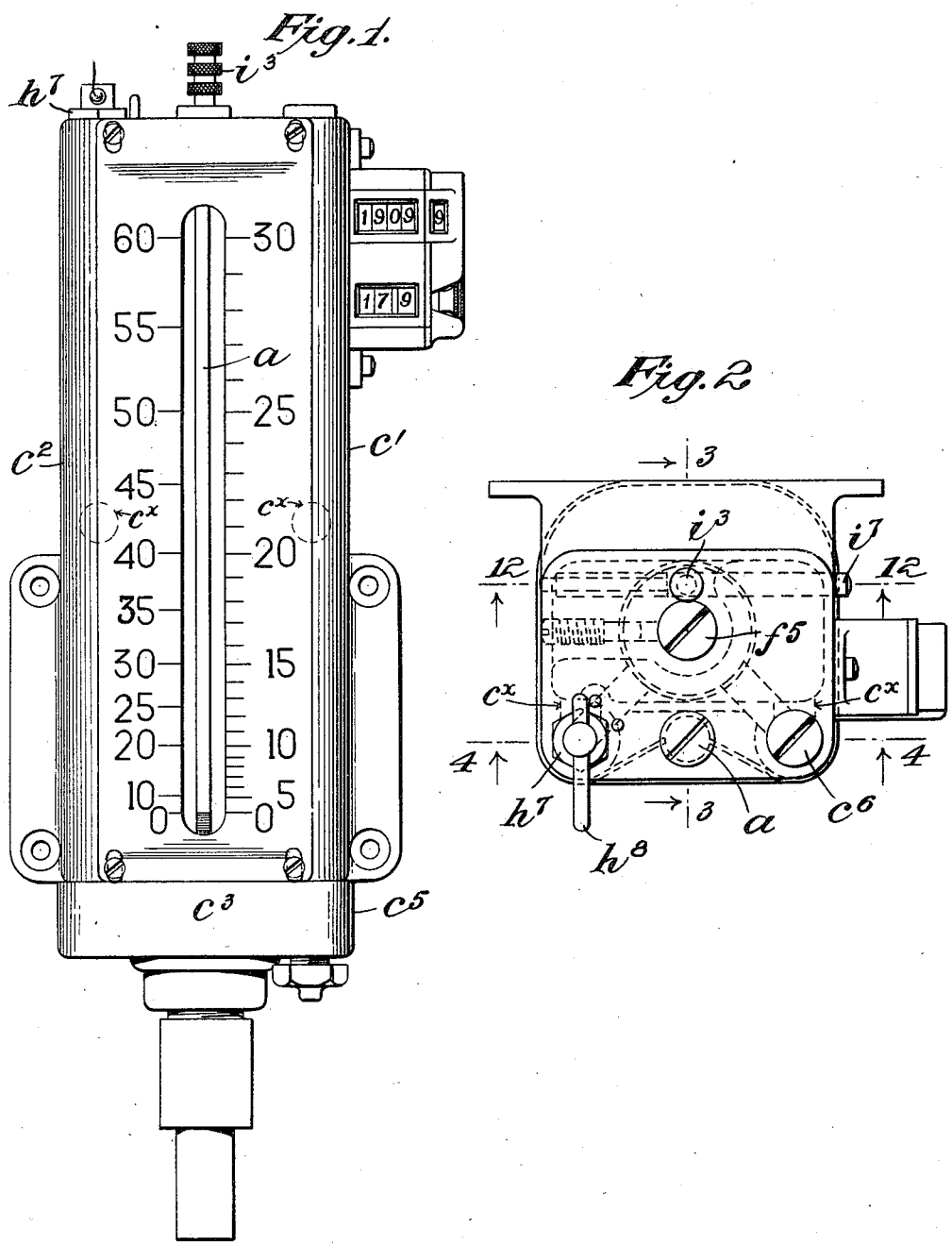

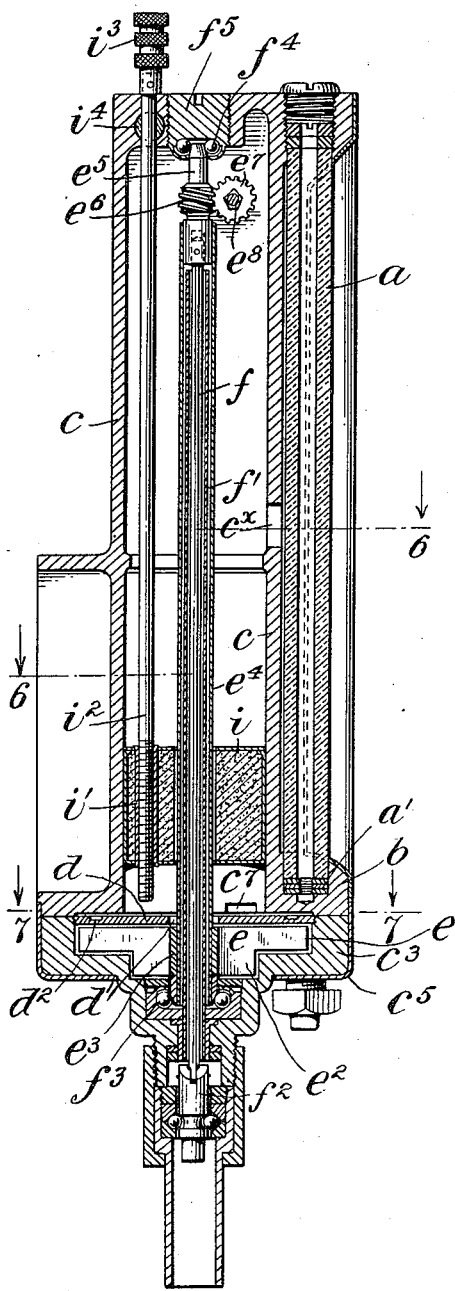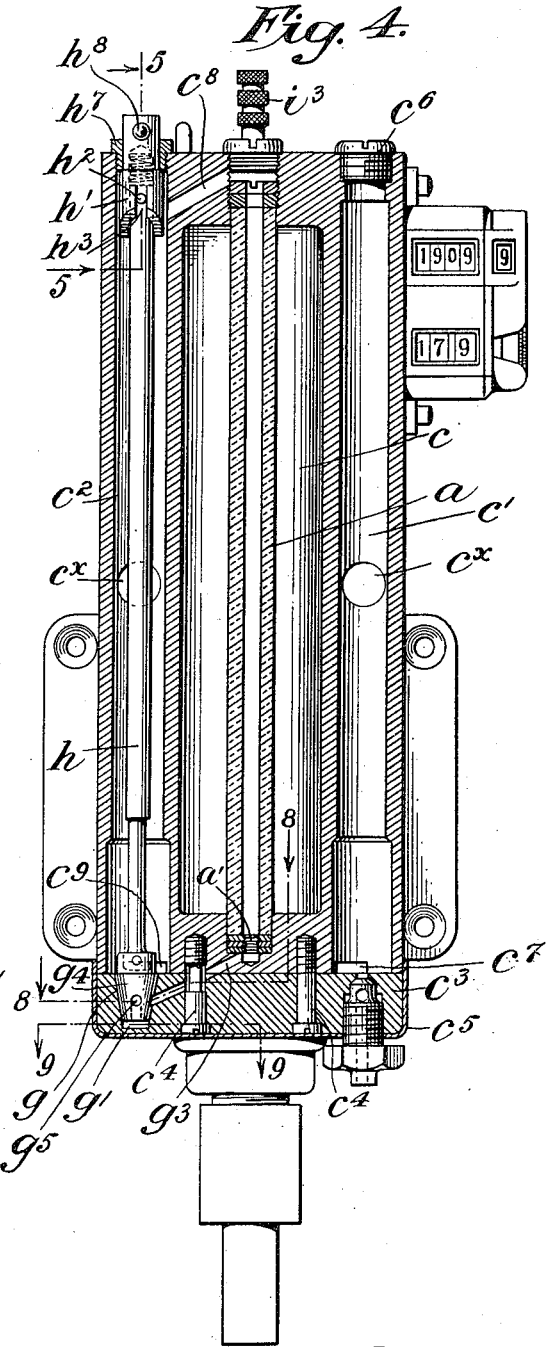

C. H. VEEDER.
TACHOMETER.
APPLICATION FILED MAR. 24, 1911.
1,016,906.
Patented Feb. 6, 1912.
4 SHEETS—SHEET 4.
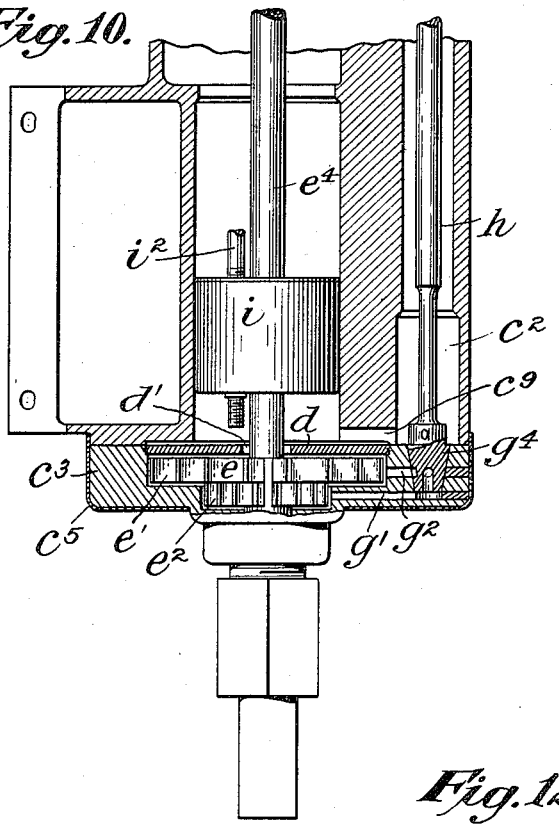
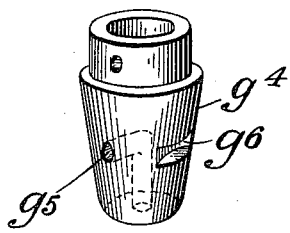
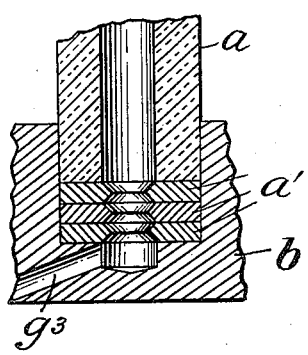
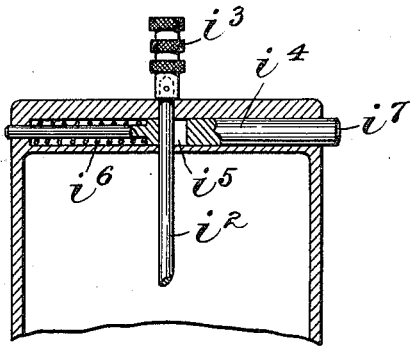
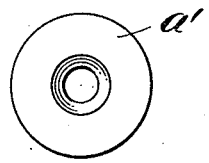
Attest:
Inventor:
Curtis Hussey Veeder
by Redding, Greeley & Austin
Attys.

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

TACHOMETER.

1,016,906. Specification of Letters Patent. Patented Feb. 6, 1912.

Application filed March 24, 1911. Serial No. 616,773.

*To all whom it may concern:*

Be it known that I, CURTIS HUSSEY VEEDER, a citizen of the United States, residing in the city of Hartford, in the State of Connecticut, have invented certain new and useful Improvements in Tachometers, of which the following is a specification, reference being had to the accompanying drawings, forming a part hereof.

This invention relates to devices or instruments for measuring the speed of shafts, wheels, &c., and of machines of various classes, of the general character of instruments shown and described in Letters Patent of the United States Nos. 732,975 and 733,358, both dated July 7, 1903, and No. 826,630, dated July 24, 1906, in which the speed is indicated by the height of a column of liquid acted upon by an impeller driven from the shaft or some other moving part of the machine.

The object of the invention is to improve the construction of such devices in various particulars with the general purpose of rendering them more accurate and reliable in operation.

The invention will be more fully explained hereinafter with reference to the accompanying drawings in which it is illustrated and in which—

Figure 1 is a view of the improved tachometer in front elevation. Fig. 2 is a top view thereof. Fig. 3 is a view in vertical section on the plane indicated by the line 3—3 of Fig. 2, looking in the direction of the arrows. Fig. 4 is a view in vertical section on the plane indicated by the line 4—4 of Fig. 2, looking in the direction of the arrows. Fig. 5 is a partial, detail view on the plane indicated by the line 5—5 of Fig. 4, looking in the direction of the arrows. Figs. 6 and 7 are detail views on the planes indicated by the lines 6—6 and 7—7 of Fig. 3, looking down. Figs. 8 and 9 are partial, detail views on the planes indicated by the lines 8—8 and 9—9 of Fig. 4, looking down. Fig. 10 is a partial, detail view in vertical section on the plane indicated by the line 10—10 of Fig. 7, looking in the direction of the arrows. Fig. 11 is a perspective view of the tapered valve to be referred to. Fig. 12 is a partial detail view in section on the plane indicated by the line 12—12 of Fig. 2, looking in the direction of the arrows. Figs. 13 and 14 are detail views of the choking device at the bottom of the indicating tube.

The glass indicator tube $a$ is mounted upon a base $b$ in such relation to the displacement-plunger chamber $c$ and to the two reservoirs $c'$ and $c^2$, which are connected with the indicator tube and chamber as hereinafter described, that the center of gravity of the free surfaces of the liquid in the reservoirs $c'$ and $c^2$ and, it may be, in the chamber $c$ is substantially coincident with the center of gravity of the free surface of the liquid in the indicator tube, so that acceleration or retardation of the moving body on which the instrument is mounted, or an inclination thereof to either side, has practically no effect on the indicator. Furthermore, it makes it possible to adjust the scale to the level of the liquid in the indicator tube instead of changing the volume of the liquid so that its level shall coincide with the stationary scale. In carrying out the adjustment of said scale, I prefer to employ a plurality of slots $k$, adapted to receive set screws $l$, which latter may be threaded into any convenient portion of the body of the device. Other means to accomplish this scale movement may obviously be employed without departing from the spirit of the invention. The chamber $c$ with the reservoirs $c'$ and $c^2$, one of which serves as a filling tube and the other as a return tube, is conveniently formed in a single piece or casing, the bottom $c^3$ of which is secured thereto in such a manner as to avoid the possibility of leakage.

As shown in the drawings, the bottom $c^3$ is formed independently of the main casing, is properly fitted to the lower end thereof, and is secured thereto by screws $c^4$, while a tight joint is assured by the use of a drawn cup $c^5$ which extends above the plane of the joint between the bottom and the main casing and, before being applied, is filled with a suitable cement, such as shellac, and is forced into place while the cement is soft. The formation of the bottom $c^3$ in a separate piece facilitates manufacture and assembling of the parts, and enables the instrument to be kept within a comparatively narrow width, especially as the bottom $c^3$ forms the pump case, in which is located the impeller. The reservoir or filling tube $c'$ is provided at its top with a removable screw cap $c^6$ and at its lower end with a port $c^7$ through which communication is established with the main chamber $c$. The reservoir or return tube $c^2$ communicates at its upper end with the indicator tube $a$, as by a channel $c^8$, and at its lower end is provided with a port $c^9$ through which communication is established with the main chamber $c$. Both reservoirs are also connected, at some point well above the surface of the liquid, with the displacement-plunger chamber, as by channels indicated by dotted lines at $c^x$, so that the equilibrium of air pressure on the surface of the liquid in the chamber and reservoirs may be maintained. The bottom $c^3$ is suitably chambered to form a pump case and receive the impeller and between the main chamber and the pump case is interposed a diaphragm $d$ having a central aperture $d'$ and indentations $d^2$ near the periphery to facilitate the screwing of the diaphragm into place in the pump case.

The impeller $e$ is double, consisting of one part $e'$ of relatively large diameter, by which the liquid is acted upon at relatively low speeds, and a part $e^2$ of relatively small diameter by which the liquid is acted upon at relatively high speeds, provision being made, as hereinafter described, for controlling the communication between the indicating tube and one part or the other of the pump case, which is made to conform to the different diameters of the impeller. In order that the impeller may be driven by a shaft concentric therewith, while avoiding the friction of a stuffing box, provision for mounting and driving the impeller is made as follows: The hub $e^3$ of the impeller is secured to a sleeve shaft $e^4$ which extends upward through the main chamber to a point near the upper end thereof where it is secured to a short, solid shaft $e^5$, on which may be secured or formed the worm $e^6$ which engages the worm wheel $e^7$ on the odometer shaft $e^8$. To the short shaft $e^5$ is secured a shaft $f$ which is extended downwardly through a tube $f'$, the open upper end of which stands above the level of the liquid in the main chamber, while the lower end is tightly secured in the pump case $c^3$. The shaft $f$ is extended down through the tube $f'$ and through the bottom of the pump case and receives at its lower end the coupling $f^2$ to which the usual flexible shaft may be connected. Suitable bearings are provided at $f^3$ in the bottom of the pump case, and at $f^4$ is an adjustable screw cap $f^5$, seated in the upper end of the main casing $c^3$. The impeller is thus driven by a shaft coming through the bottom of the tachometer and concentric with the impeller without requiring the use of a stuffing box. In the bottom part or pump casing $c^3$ is formed a valve chamber $g$, preferably tapered as shown, which communicates at its lower end, by a channel $g'$, with the high speed or small diameter portion of the pump case.

Communication is established with the low speed or large diameter portion of the pump case through a channel $g^2$ and with the lower end of the indicator tube $a$ through a channel $g^3$, the ports or ends of the channels $g^2$ and $g^3$ in the valve chamber $g$ being in substantially the same horizontal plane. A tapered valve plug $g^4$ is seated in the valve chamber $g$ and is provided with a right-angled channel $g^5$ which is adapted, when the valve plug is turned properly, to place the channel $g'$, and therefore the high speed portion of the pump case, in communication with the channel $g^3$ and the indicator tube. The valve plug $g^4$ is also provided with a channel $g^6$ which is adapted, when the valve plug is turned properly, to place the channel $g^2$, and therefore the low speed portion of the pump case, in communication with the channel $g^3$ and the tube.

The tapered valve has such a taper that it will not stick in its seat and is turned and held to its seat by a shaft $h$ which extends upward through the return tube $c^2$. Its upper end is received in a recessed, slotted head $h'$, having a transverse pin $h^2$ to engage the transverse slot $h^3$ of the head, while a spring $h^4$, in the recess $h^5$, presses the shaft downward and holds the valve to its seat. The head $h'$ is shouldered, as at $h^6$, and is mounted rotatably in a thimble $h^7$ which is threaded into the top of the main casing and is provided with a handle $h^8$ by which the shaft may be rotated to shift the valve so as to establish communication between either the low speed portion or the high speed portion of the pump case and the indicator tube.

The adjusting plunger $i$, by which the liquid in the reservoir is displaced for purposes of adjustment, is provided with a screw threaded sleeve $i'$ to be engaged by a screw threaded rod $i^2$. At its upper end, above the top of the main casing, the rod $i^2$ is provided with an operating knob $i^3$ and is held in adjusted position by a friction plunger $i^4$, which is mounted in the top of the main casing, and is slotted, as at $i^5$, to permit the passage therethrough of the rod $i^2$. A spring $i^6$ normally presses the friction plunger against the rod so as to prevent movement thereof, but the pressure may be relieved by pressing with the finger upon the projecting end $i^7$ of the plunger. In this manner the adjusting plunger $i$ may not only be adjusted with nicety by rotation of the shaft $i^2$ but it may be moved up and down for the purpose of dislodging bubbles of air when the instrument is being filled.

As shown in Figs. 3, 4, 13 and 14, the indicating tube $a$ is provided at its lower end with a choking device so as to reduce the flow of the liquid when the speed exceeds the maximum on the low speed side and hence the liquid begins to rise over the top of the indicator tube. This choking device may take various forms. The device shown in the figures referred to has the advantage of choking the motion of the liquid without reducing the aperture to very small dimensions. It comprises a plurality of perforated disks $a'$, placed below the lower end of the tube $a$ and counter sunk on both sides so as to form openings with sharp edges with small chambers between.

The operation of the improved tachometer will be readily understood. The shaft $f$ being coupled to the usual flexible shaft or other driving part, the impeller $e$ will be driven at a speed proportionate to the speed of the driving member. If the speed is comparatively low the valve $g^4$ is turned so as to place the portion of the pump case of larger diameter in communication with the indicator tube and the readings are then taken from the slow speed scale, shown at the right of the indicator tube in Fig. 1. If the speed increases above the maximum slow speed, the valve is turned so as to place the portion of the pump case of smaller diameter in communication with the indicator tube and the reading is then taken from the high speed scale at the left hand side of the indicator tube. It is not necessary to separate the two parts of the pump case as the leakage from one to the other is not sufficient to affect the readings and moreover is a substantially constant factor for all speeds.

It will be obvious that various changes in details of construction and arrangement may be made to suit different conditions of use and that the invention, therefore, is not limited to the precise construction and arrangement shown and described herein.

I claim as my invention:

1. In an instrument of the character described, the combination of an indicator tube, a casing having a main chamber and a pump chamber communicating with the main chamber and with the indicator tube, an impeller in said pump chamber with its axis vertical, an open ended tube secured at its lower end in the bottom of the pump chamber, a central shaft extended upward through said tube, a sleeve shaft, and means to connect said sleeve shaft to said central shaft above the upper end of said tube said sleeve shaft supporting the impeller at its lower end.

2. In an instrument of the character described, the combination of a main casing having a main chamber formed therein, a bottom part formed with a pump chamber, an indicator tube supported on said casing, said pump chamber communicating with the main chamber and the indicator tube, an open ended tube secured in said bottom part and extended upward into the main chamber, a central shaft extended upward through said tube, a sleeve shaft, means to connect said sleeve shaft to said central shaft at its upper end and an impeller located in the pump chamber and secured to said sleeve shaft.

3. In an instrument of the character described, the combination of a main casing having a main chamber formed therein, a bottom part having a pump chamber formed therein, an indicator tube mounted on the main casing, said pump chamber communicating with the main chamber and the indicator tube, an open ended tube secured at its lower end in said bottom part and extended upward into the main chamber, a central shaft extended upward through said tube, a short shaft secured to the upper end of said central shaft above the upper end of said tube and having a bearing in the top of the main casing and a sleeve shaft secured to said short shaft and depending about said tube and an impeller located in the pump chamber and secured to said sleeve shaft.

4. In an instrument of the character described, the combination of a main casing having a main chamber formed therein, an indicator tube mounted on said casing, a bottom portion formed independently of the main casing and having formed therein a pump chamber which communicates with the main chamber and the indicator tube, means to secure the bottom portion to the main casing, and an outer shell overlapping the joint between the main casing and the bottom portion and cemented to both.

5. In an instrument of the character described, the combination of a casing having formed therein a main chamber and a pump chamber with portions of different diameters, a valve seat formed in the bottom of the casing and having ports which communicate respectively with the different portions of the pump chamber and with the indicator tube, a valve plug coöperating with said valve seat and adapted to place the indicator tube in communication with one portion or the other of the valve chamber, and an operating shaft for said valve extended upward through the top of the casing.

6. In an instrument of the character described, the combination of a casing having formed therein a main chamber and a pump chamber having portions of different diameters and a vertical, tapered valve seat communicating with the two portions of the pump chamber and with the indicator tube, a tapered valve plug coöperating with said valve seat and adapted to place the indicator tube in communication with one portion or the other of the pump chamber, a rotatable, recessed head mounted in the top of the casing, an operating shaft for said valve plug and engaging said head, and a spring located in the recess of the head and acting upon the valve shaft to press the valve to its seat.

7. In an instrument of the character described, the combination of a casing having formed therein a main chamber and a pump chamber having portions of different diameters and a vertical, tapered valve seat communicating with the two portions of the pump chamber and with the indicator tube, a tapered valve plug coöperating with said valve seat and adapted to place the indicator tube in communication with one portion or the other of the pump chamber, a rotatable, vertically slotted and recessed head mounted in the top of the casing, an operating shaft for said valve plug and entering the recess of the head and having a transverse pin entering the slots of the head, and a spring located in the recess of the head and acting upon the shaft to press the valve plug yieldingly to its seat.

8. In an instrument of the character described, the combination of a casing formed with a main chamber and a pump chamber, an indicator tube, said pump chamber communicating with the main chamber and the indicator tube, a plunger mounted in the main chamber, and a rod engaging the plunger and extended vertically through the head of the casing.

9. In an instrument of the character described, the combination of a casing formed with a main chamber and a pump chamber, an indicator tube, said pump chamber communicating with the main chamber and the indicator tube, a plunger mounted in the main chamber, and a rod having a screw threaded engagement with the plunger and extended vertically through the head of the casing, said rod being both rotatable and movable vertically.

10. In an instrument of the character described, the combination of a casing formed with a main chamber and a pump chamber, an indicator tube, said pump chamber communicating with the main chamber and the indicator tube, a plunger mounted in the main chamber, a rod having a screw threaded engagement with the plunger and extended vertically through the head of the casing, said rod being both rotatable and movable vertically, and a friction plunger mounted in the head of the casing and coöperating with said rod to prevent accidental movement thereof.

11. In an instrument of the character described, the combination of a casing formed with a main chamber and a pump chamber, an indicator tube, said pump chamber communicating with the main chamber and the indicator tube, a plunger mounted in the main chamber, a rod having a screw threaded engagement with the plunger and extended vertically through the head of the casing, said rod being both rotatable and movable vertically, and a spring pressed friction plunger mounted in the head of the casing and slotted transversely to permit the passage therethrough of said rod.

12. In an instrument of the character described, the combination of a casing having a main chamber and a pump chamber formed therein, an indicator tube, said pump chamber communicating with the main chamber and with the indicator tube, and a choking device interposed between the pump chamber and the indicator tube, said choking device consisting of a series of perforated, countersunk disks placed one upon another.

13. In an instrument of the character described, the combination of an indicator tube, two liquid reservoirs disposed with respect to said indicator tube so that the center of gravity of the surfaces of the liquid in the reservoirs substantially coincides with that of the surface of the liquid in the indicator tube, and connected therewith, and a pump interposed in the connections between the reservoirs and the indicator tube.

14. In an instrument of the character described, the combination of an indicator tube, two liquid reservoirs disposed with respect to said tube so that the center of gravity of the surfaces of the liquid in the reservoirs substantially coincides with that of the surface of the liquid in the indicator tube, a main chamber and a pump, said indicator tube, reservoirs, main chamber and pump being interconnected.

This specification signed and witnessed this 20th day of March, A. D., 1911.

CURTIS HUSSEY VEEDER.

Signed in the presence of—
E. BARRIE SMITH,
AMASA TROWBRIDGE.

---

Copies of this patent may be obtained for five cents each, by addressing the "Commissioner of Patents, Washington, D. C."